(No Model.)

A. KROLL.
RAIN WATER CUT-OFF.

No. 524,113.    Patented Aug. 7, 1894.

Witnesses:
L. C. Hills
E. H. Bond

Inventor:
August Kroll,
by E. B. Stocking
Attorney.

UNITED STATES PATENT OFFICE.

AUGUST KROLL, OF LEOPOLIS, WISCONSIN.

RAIN-WATER CUT-OFF.

SPECIFICATION forming part of Letters Patent No. 524,113, dated August 7, 1894.

Application filed October 31, 1893. Serial No. 489,631. (No model.)

*To all whom it may concern:*

Be it known that I, AUGUST KROLL, a citizen of the United States, residing at Leopolis, in the county of Shawano, State of Wisconsin, have invented certain new and useful Improvements in Rain-Water Cut-Offs, of which the following is a specification, reference being had therein to the accompanying drawings.

This invention relates to certain new and useful improvements in cut-offs of that class in which a rotatable or partially rotatable part is mounted within another part and arranged to conduct the water from the eaves trough to the cistern or to the sewer or ground or any other desired place to empty the pipes and prevent bursting thereof by freezing, or when the cistern is full.

It has for its objects among others to provide an improved and simple and cheap cut-off which can be arranged at the upper end of the down spout in proximity to the eaves trough, and having provisions for preventing accumulation of water at the joints, and the outer portion being slit and provided with a spring connection to allow of the necessary expansion and contraction and yet providing a sufficiently tight bearing for the rotatable part.

Other objects and advantages of the invention will hereinafter appear and the novel features thereof will be particularly pointed out in the appended claims.

The invention is clearly illustrated in the accompanying drawings, which, with the letters of reference marked thereon, form a part of this specification, and in which—

Figure 1:
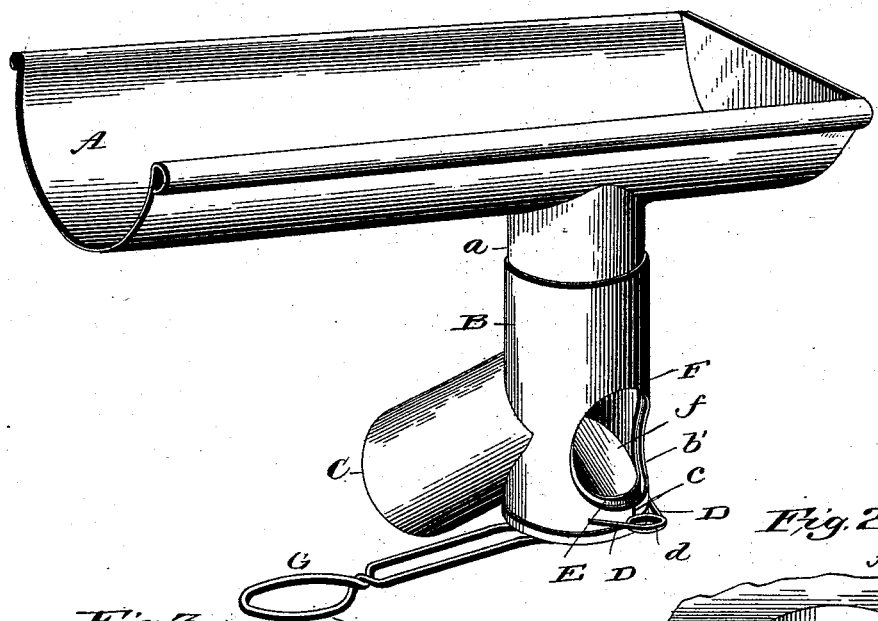
Figure 3:
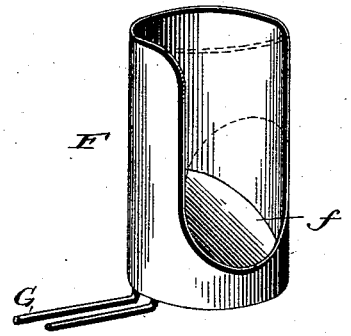
Figure 2:
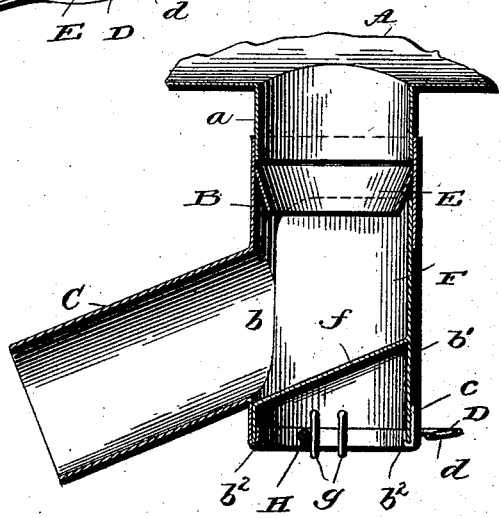

Figure 1 is a perspective view of a portion of an eaves trough with my improved cut-off in position. Fig. 2 is a vertical section through the same with the rotatable part in its other position. Fig. 3 is a perspective detail showing a slightly modified form of the rotatable part removed.

Like letters of reference indicate like parts throughout the several views.

Referring now to the details of the drawings by letter, A designates a portion of an eaves trough of any approved construction, and having at one end the depending neck or portion $a$ as usual.

B is the tubular part which is designed to be sleeved on over the depending neck or portion $a$ and held in place by frictional engagement of the parts. This tubular part has two or more openings disposed relatively to each other as circumstances may require. I have shown one, $b$, as communicating with the pipe C which may lead to the cistern or any other desired place where it may be desired to conduct the water as it flows from the eaves trough and the other $b'$ may be made to communicate with a pipe, not shown, leading to the sewer or any other place where the water may be conducted when the rotatable part is turned to allow the water to flow therethrough. The portion of this tubular part below the opening $b'$ is slit vertically as seen at $c$ and the two parts thus formed are connected by the spring strip D the ends of which are connected to the parts upon opposite sides of the slit in any suitable manner, and a coil $d$ is formed in the said strip opposite the slit as seen in Figs. 1 and 2. By this means the lower end of the tubular part is free to contract and expand as may be necessary and yet the joint will be prevented from spreading by the spring strip.

Within the upper end of the tubular part B with its upper edge located a short distance below the upper edge of the said tubular part is the ring E which is secured to the inner wall of the part B at its upper edge and its lower end is contracted as seen in Fig. 2 so as to conduct the water as it flows from the neck or portion $a$ through the part B and thus keep the water from contact with the wall of the tubular part.

F is the inner rotatable part; it is preferably of the form shown in Fig. 3 with the opening on one side extending clear to the top, but it may have a vertical oblong opening as indicated by dotted lines in said Fig. 3 and as seen in Fig. 1. It is mounted for rotation within the lower end of the tubular part B as seen in Figs. 1 and 2 and has preferably an inclined bottom $f$ as seen in all of the views, but the incline of the bottom may be more or less as may be found most expedient. The upper edge of this part F preferably extends upward a sufficient distance to be held between the inner wall of the tubular part B and the ring E as seen in Fig. 2, and its lower end is held loosely in and guided by the upturned inner flange $b^2$ at the lower end of the said tubular part B as shown in Fig. 2.

The rotatable part F may be turned within the tubular part B in any desired manner; I have shown a convenient means which consists of a wire having its ends bent upward in a vertical plane as seen at $g$ in Fig. 2 and secured to the said rotatable part in any suitable manner and its two portions extending horizontally or substantially so as seen in Figs. 1 and 3 and formed with a loop or coil G as shown in Fig. 1 by which it may be actuated to rotate the part F. This may be easily done from the ground by means of a pole or other means, not shown. The movement of the rotatable part F is limited by means of a stop H as seen in Fig. 2.

Modifications in detail may be resorted to without departing from the spirit of the invention or sacrificing any of its advantages.

What I claim as new is—

1. The combination with the vertically-disposed conducting pipe having a slit near its lower end, of a spring strip bridging the slit and secured to the conducting pipe upon opposite sides of the slit, and the rotatable cut-off held by the slit portion, as set forth.

2. The combination with the vertically-disposed conducting pipe having a vertical slit near its lower end, of a spring strip bridging the slit and secured to the conducting pipe upon opposite sides of the slit, and a vertically-disposed cut-off rotatably mounted in the conducting pipe, as set forth.

3. The combination with the vertically-disposed conducting pipe with its flange at the lower end and the ring near its upper end with inclined walls, of the rotatable cut-off having its lower end loosely held by said flange and its upper end extended above the lower end of and guided in its rotation by said ring, substantially as specified.

In testimony whereof I affix my signature in presence of two witnesses.

AUGUST KROLL.

Witnesses:
P. J. HEINL,
JOHN SCHMOHL.